(12) United States Patent
Bean et al.

(10) Patent No.: US 7,707,362 B2
(45) Date of Patent: Apr. 27, 2010

(54) CONTEXT-FREE DATA TRANSACTIONS BETWEEN DUAL OPERATING SYSTEMS EMBEDDED WITHIN A DATA STORAGE SUBSYSTEM

(75) Inventors: Robert George Bean, Monument, CO (US); Clark Edward Lubbers, Colorado Springs, CO (US); Robert Brinham Trace, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1104 days.

(21) Appl. No.: 11/171,712

(22) Filed: Jun. 30, 2005

(65) Prior Publication Data

US 2007/0022147 A1 Jan. 25, 2007

(51) Int. Cl.
*G06F 12/00* (2006.01)
(52) U.S. Cl. .................. 711/147; 711/170; 711/203; 711/209; 711/E12.016; 711/E12.058; 711/E12.065
(58) Field of Classification Search .................. None
See application file for complete search history.

(56) References Cited

U.S. PATENT DOCUMENTS

| | | | |
|---|---|---|---|
| 5,349,680 A | 9/1994 | Fukuoka | |
| 5,771,383 A * | 6/1998 | Magee et al. | 719/312 |
| 5,867,734 A * | 2/1999 | Drews | 710/52 |
| 5,903,913 A | 5/1999 | Ofer et al. | |
| 6,101,599 A | 8/2000 | Wright et al. | |
| 6,134,577 A * | 10/2000 | Straub et al. | 718/100 |
| 6,505,269 B1 | 1/2003 | Potter | |
| 6,622,185 B1 | 9/2003 | Johnson et al. | |
| 6,728,962 B1 | 4/2004 | Chalmer et al. | |
| 6,754,828 B1 * | 6/2004 | Marisetty et al. | 726/2 |
| 6,799,255 B1 | 9/2004 | Blumenau et al. | |
| 6,834,325 B1 | 12/2004 | Milillo et al. | |
| 2002/0073296 A1 * | 6/2002 | Buch et al. | 711/202 |
| 2002/0120809 A1 | 8/2002 | Machida et al. | |
| 2002/0194380 A1 | 12/2002 | Sullivan et al. | |
| 2003/0061427 A1 | 3/2003 | O'Donnell | |
| 2003/0088591 A1 | 5/2003 | Fish | |
| 2003/0188100 A1 | 10/2003 | Solomon et al. | |
| 2004/0064461 A1 | 4/2004 | Pooni et al. | |
| 2004/0123286 A1 | 6/2004 | Kang et al. | |
| 2004/0230787 A1 | 11/2004 | Blumenau et al. | |
| 2004/0244008 A1 | 12/2004 | Lee | |
| 2005/0033934 A1 | 2/2005 | Paladini et al. | |
| 2005/0050242 A1 | 3/2005 | Chen | |
| 2005/0080982 A1 | 4/2005 | Vasilevsky et al. | |
| 2005/0081220 A1 | 4/2005 | Yodaiken et al. | |
| 2005/0120177 A1 | 6/2005 | Black | |
| 2005/0251806 A1 * | 11/2005 | Auslander et al. | 718/100 |
| 2006/0230209 A1 * | 10/2006 | Gregg et al. | 710/263 |

* cited by examiner

*Primary Examiner*—Reginald G Bragdon
*Assistant Examiner*—Shawn X Gu
(74) *Attorney, Agent, or Firm*—Fellers, Snider, et al.

(57) ABSTRACT

A method is provided for storing and retrieving data in a network-attached data storage device by a cooperatively multitasking real time operating system configured to execute datapath routines and a general purpose operating system kernel configured to communicate with the network.

16 Claims, 7 Drawing Sheets

CONTEXT-FREE DATA TRANSACTIONS BETWEEN DUAL OPERATING SYSTEMS EMBEDDED WITHIN A DATA STORAGE SUBSYSTEM

FIELD OF THE INVENTION

The claimed invention relates generally to the field of distributed data storage systems and more particularly, but not by way of limitation, to an apparatus and method for increasing the processing throughput of data services by a storage system.

BACKGROUND

Storage networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, even more recently the trend has been toward storage-centric solutions. However, there are tremendous processing overhead challenges that must be solved in order to pave the way to storage-centric viability. What is needed is an intelligent data storage subsystem that self-deterministically manages network transactions as well as datapath control transactions, and does so fast and reliably. It is to this solution that embodiments of the present invention are directed.

SUMMARY OF THE INVENTION

Embodiments of the present invention are generally directed to mapping of memory and resources in a distributed storage system.

In some embodiments a method is provided for storing and retrieving data in a network-attached data storage device by a cooperatively multitasking real time operating system configured to execute datapath routines and a general purpose operating system kernel configured to communicate with the network.

In some embodiments a method is provided comprising providing a data storage subsystem comprising an embedded processor; operating the processor in a user mode for executing datapath control firmware threads; and operating the processor in a kernel mode for executing kernel threads.

In some embodiments a distributed storage system is provided, comprising a data storage subsystem comprising an embedded operating system kernel; and means for communicating between a firmware process and the kernel by making a shared memory available to both at the same virtual address.

These and various other features and advantages which characterize the claimed invention will become apparent upon reading the following detailed description and upon reviewing the associated drawings.

DETAILED DESCRIPTION

Figure 1:
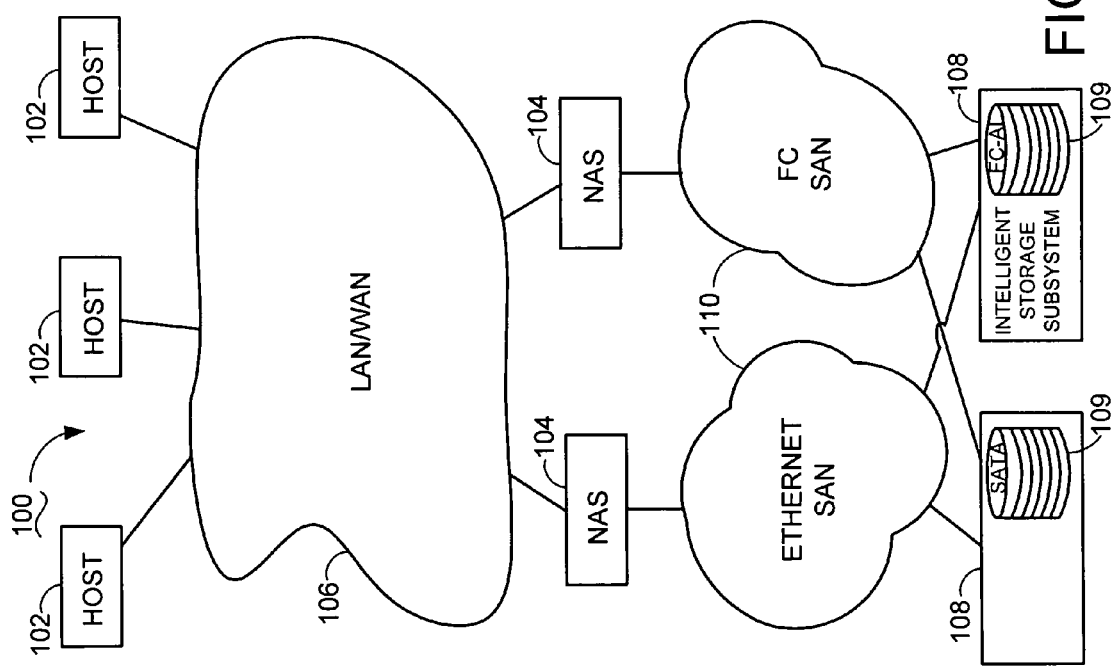
FIG. 1 is a diagrammatic representation of a distributed data storage system in which embodiments of the present invention are useful.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent data storage subsystems 108. Accordingly, SANs 110 connect the servers 104 to the intelligent data storage subsystems 108 for access to the stored data. The intelligent data subsystems 108 provide blocks of data storage capacity 109 for storing the data over various selected communication protocols such as serial ATA and fibre-channel, with enterprise or desktop class storage medium within it.

Figure 2:
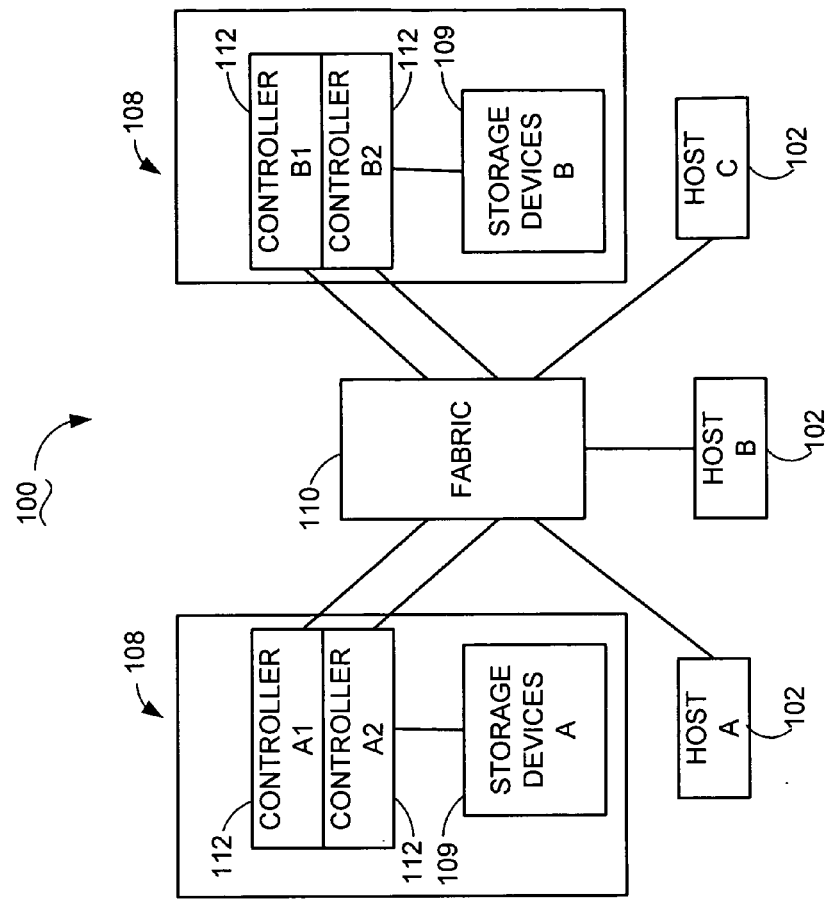
FIG. 2 is a simplified diagrammatic representation of the computer system of FIG. 1.

FIG. 2 is a simplified diagrammatic view of the computer system 100 of FIG. 1. The hosts 102 interact with each other as well as with a pair of the intelligent data storage subsystems 108 (denoted A and B, respectively) via the network or fabric 110. Each intelligent data storage subsystem 108 includes dual redundant controllers 112 (denoted A1, A2 and B1, B2) preferably operating on the data storage capacity 109 as a set of data storage devices characterized as a redundant array of independent drives (RAID). The controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

It is further contemplated that the A host computer 102 and the A intelligent data storage subsystem 108 can be physically located at a first site, the B host computer 102 and B intelligent data storage subsystem 108 can be physically located at a second site, and the C host computer 102 can be yet at a third site, although such is merely illustrative and not limiting. All entities on the distributed computer system are connected over some type of computer network.

Figure 3:
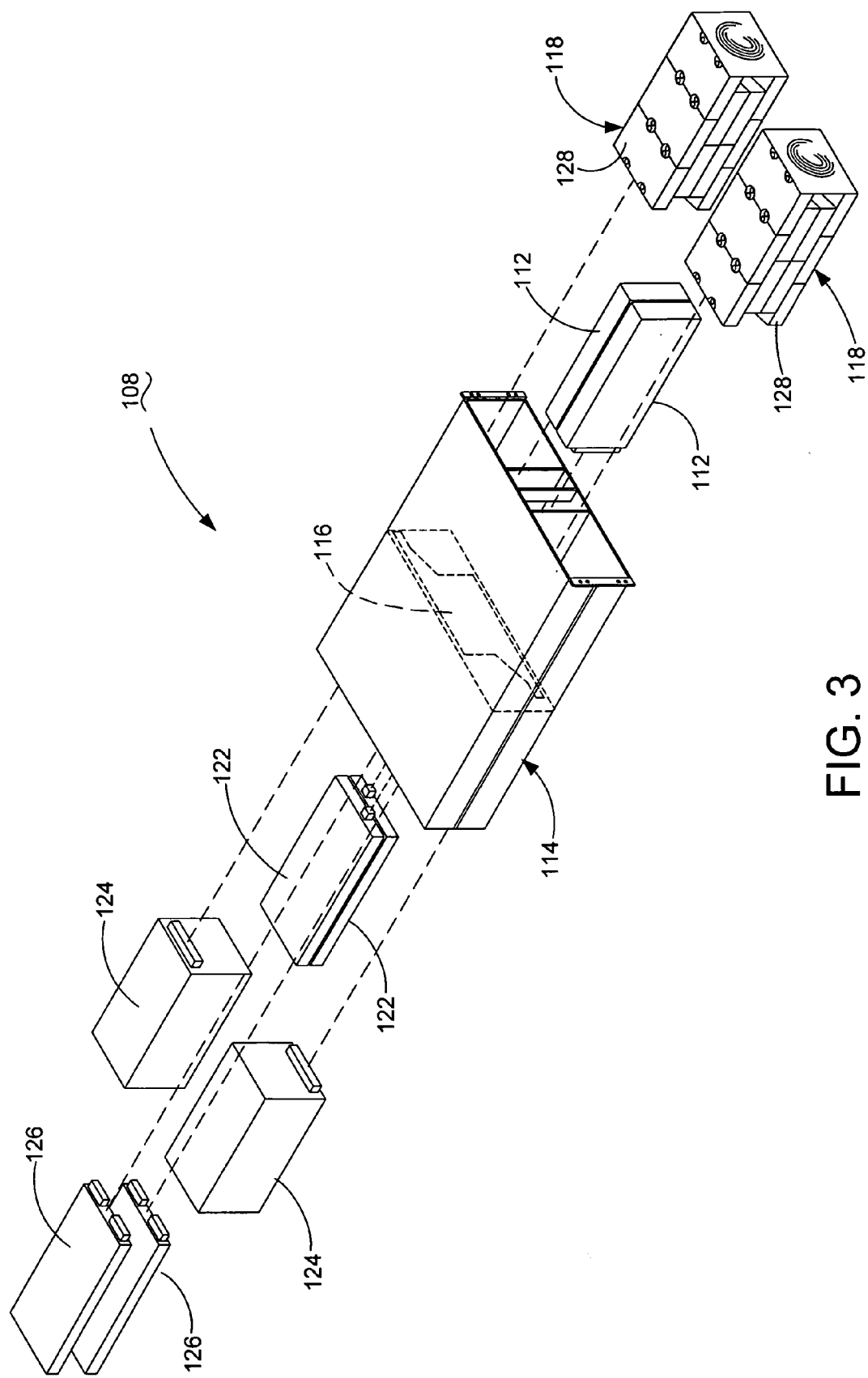
FIG. 3 is an exploded isometric view of an intelligent data storage subsystem constructed in accordance with embodiments of the present invention.

FIG. 3 illustrates an intelligent data storage subsystem 108 constructed in accordance with embodiments of the present invention. A shelf 114 defines cavities for receivingly engaging the controllers 112 in electrical connection with a midplane 116. The shelf is supported, in turn, within a cabinet (not shown). A pair of multiple disc assemblies (MDAs) 118 are receivingly engageable with the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

This illustrative embodiment of the MDA 118 is the subject matter of patent application Ser. No. 10/884,605 entitled Carrier Device and Method for a Multiple Disc Array which is assigned to the assignee of the present invention and incorporated herein by reference. Another illustrative embodiment of the MDA is the subject matter of patent application Ser. No. 10/817,378 of the same title which is also assigned to the assignee of the present invention and incorporated herein by reference. In alternative equivalent embodiments the MDA 118 can be provided within a sealed enclosure, as discussed below.

Figure 4:
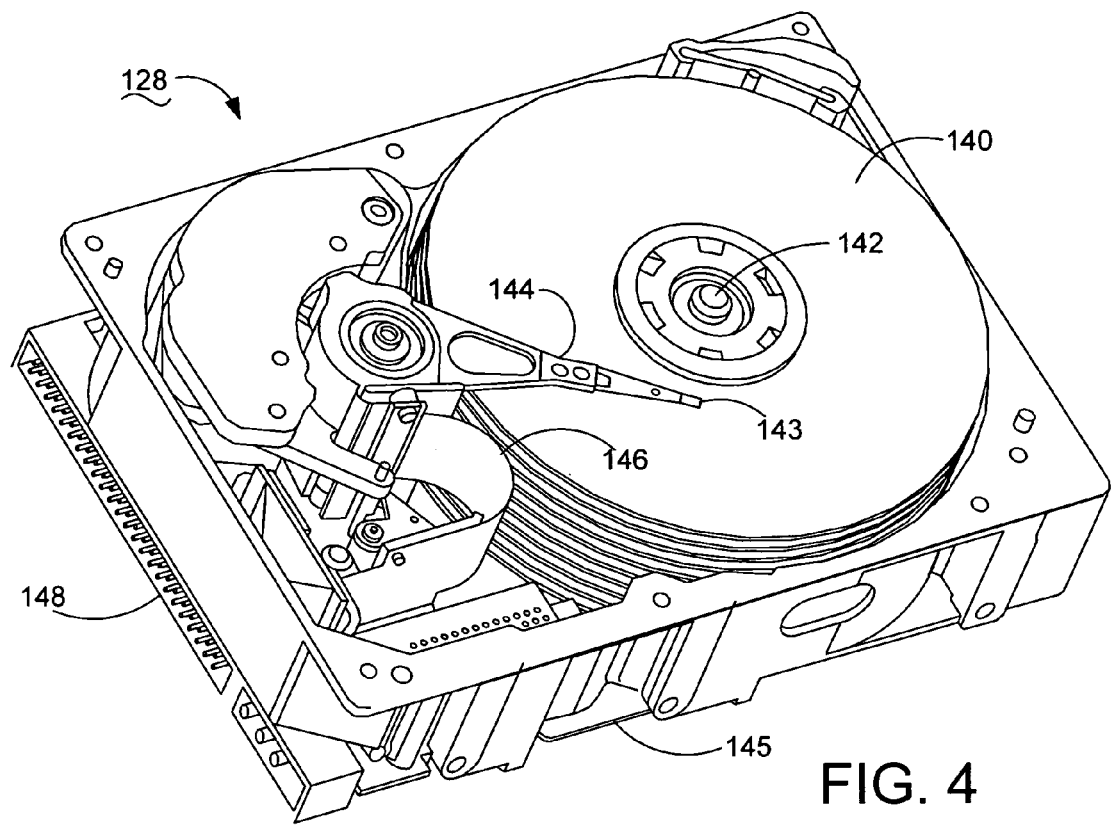
FIG. 4 is an exemplary data storage device used in the multiple disc array of FIG. 4.

FIG. 4 is an isometric view of an illustrative data storage device 128 suited for use with embodiments of the present invention and in the form of a rotating media disc drive. A data storage disc 140 is rotated by a motor 142 to present data storage locations of the disc 140 to a read/write head ("head") 143. The head 143 is supported at the distal end of a rotary actuator 144 that is capable of moving the head 143 radially between inner and outer tracks of the disc 140. The head 143 is electrically connected to a circuit board 145 by way of a flex circuit 146. The circuit board 145 is adapted to receive and send control signals controlling the functions of the data storage device 128. A connector 148 is electrically connected to the circuit board 145, and is adapted for connecting the data storage device 128 with the circuit board 134 (FIG. 4) of the MDA 118.

Figure 5:
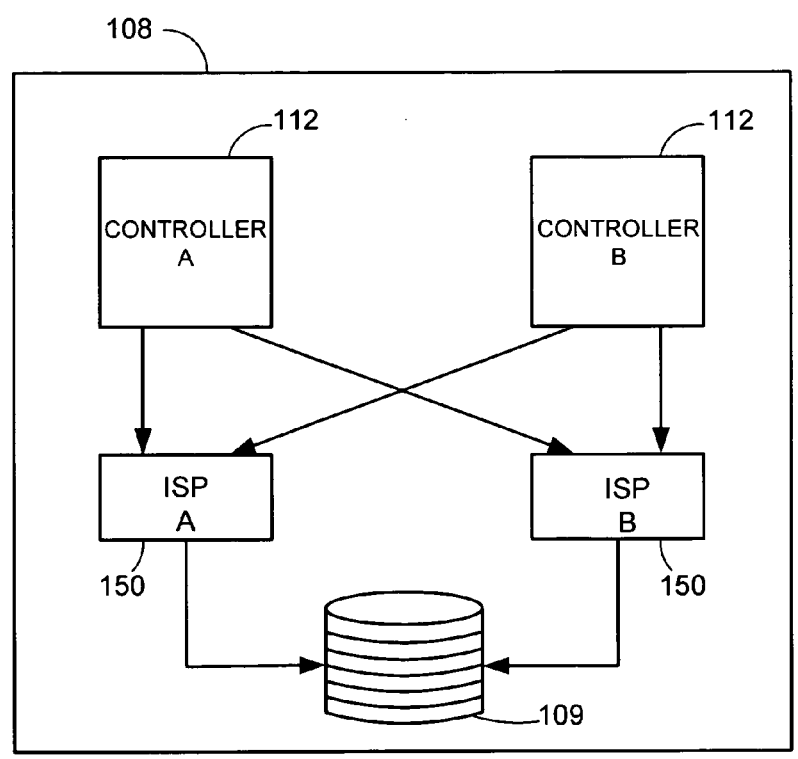
FIG. 5 is a functional block diagram of the intelligent data storage subsystem of FIG. 3.

FIG. 5 is a diagrammatic view of an intelligent data storage subsystem 108 constructed in accordance with embodiments of the present invention. The controllers 112 operate in conjunction with redundant intelligent storage processors (ISP) 150 to provide managed reliability of the data integrity. The intelligent storage processors 150 can be resident in the controller 112, in the MDA 118, or elsewhere within the intelligent data storage subsystem 108. Aspects of the managed reliability include invoking reliable data storage formats such as RAID strategies. Managed reliability can also include scheduling of diagnostic and correction routines based on a monitored usage of the system. Data recovery operations are executed for copying and reconstructing data. These and other aspects of the managed reliability aspects contemplated herein are disclosed in patent application Ser. No. 10/817,617 entitled Managed Reliability Storage System and Method which is assigned to the present assignee and incorporated herein by reference. Other aspects of the managed reliability include responsiveness to predictive failure indications in relation to predetermined rules, as disclosed for example in patent application Ser. No. 11/040,410 entitled Deterministic Preventive Recovery From a Predicted Failure in a Distributed Storage System which is assigned to the present assignee and incorporated herein by reference.

Figure 6:
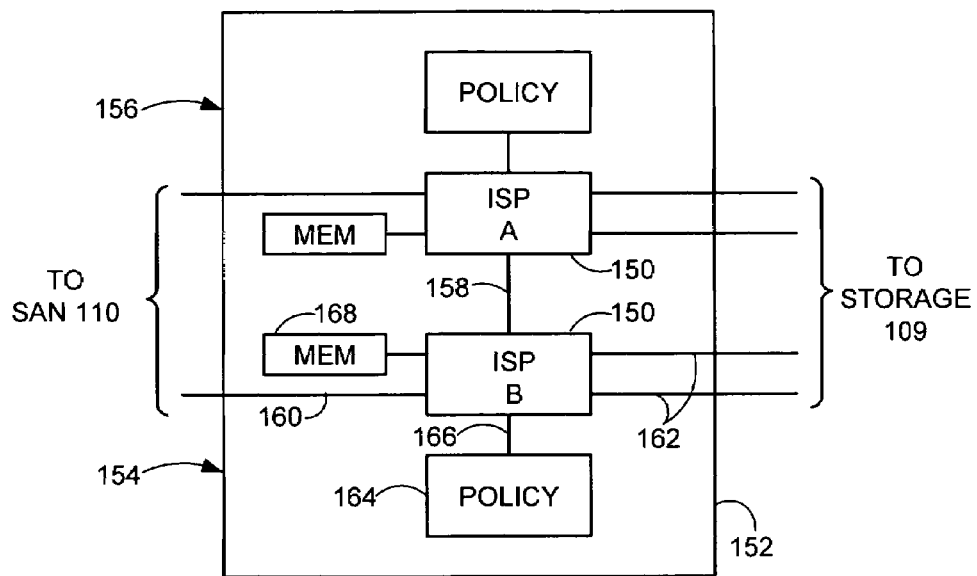
FIG. 6 is a functional block diagram of the intelligent storage processor circuit board of the intelligent data storage subsystem of FIG. 3.

FIG. 6 is a diagrammatic illustration of an intelligent storage processor circuit board 152 in which resides the pair of redundant intelligent storage processors 150. The intelligent storage processor 150 interfaces the data storage capacity 109 to the SAN fabric 110. Each intelligent storage processor 150 can manage assorted storage services such as routing, volume management, and data migration and replication. The intelligent storage processors 150 divide the board 152 into two ISP subsystems 154, 156 coupled by a bus 158. The ISP subsystem 154 includes the ISP 150 denoted "B" which is connected to the fabric 110 and the storage capacity 109 by links 160, 162, respectively. The ISP subsystem 154 also includes a policy processor 164 executing a real-time operating system. The ISP 154 and policy processor 164 communicate over bus 166, and both communicate with memory 168.

Figure 7:
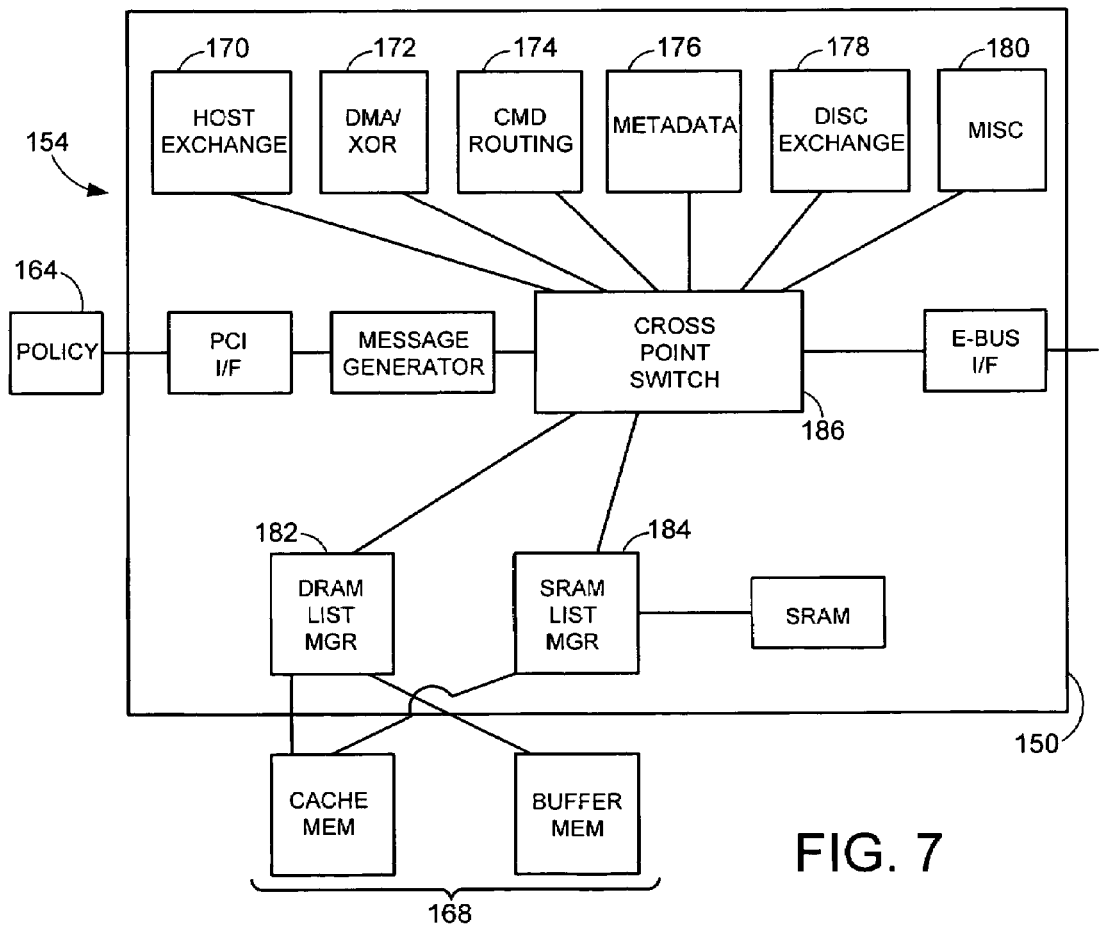
FIG. 7 is a functional block diagram of the intelligent storage processor of the intelligent data storage subsystem FIG. 3.

FIG. 7 is a diagrammatic view of an illustrative ISP subsystem 154 constructed in accordance with embodiments of the present invention. The ISP 150 includes a number of functional controllers (170-180) in communication with list managers 182, 184 via a cross point switch (CPS) 186 message crossbar. Accordingly, the controllers (170-180) can each generate CPS messages in response to a given condition and send the messages through the CPS to a list manager 182, 184 in order to access a memory module and/or invoke an ISP 150 action. Likewise, responses from a list manager 182, 184 can be communicated to any of the controllers (170-180) via the CPS 186. The arrangement of FIG. 8 and associated discussion are illustrative and not limiting of the contemplated embodiments of the present invention.

The policy processor 164 can be programmed to execute desired operations via the ISP 150. For example, the policy processor 164 can communicate with the list managers 182, 184, that is send and receive messages, via the CPS 186. Responses to the policy processor 164 can serve as interrupts signaling the reading of memory 168 registers.

Figure 8:
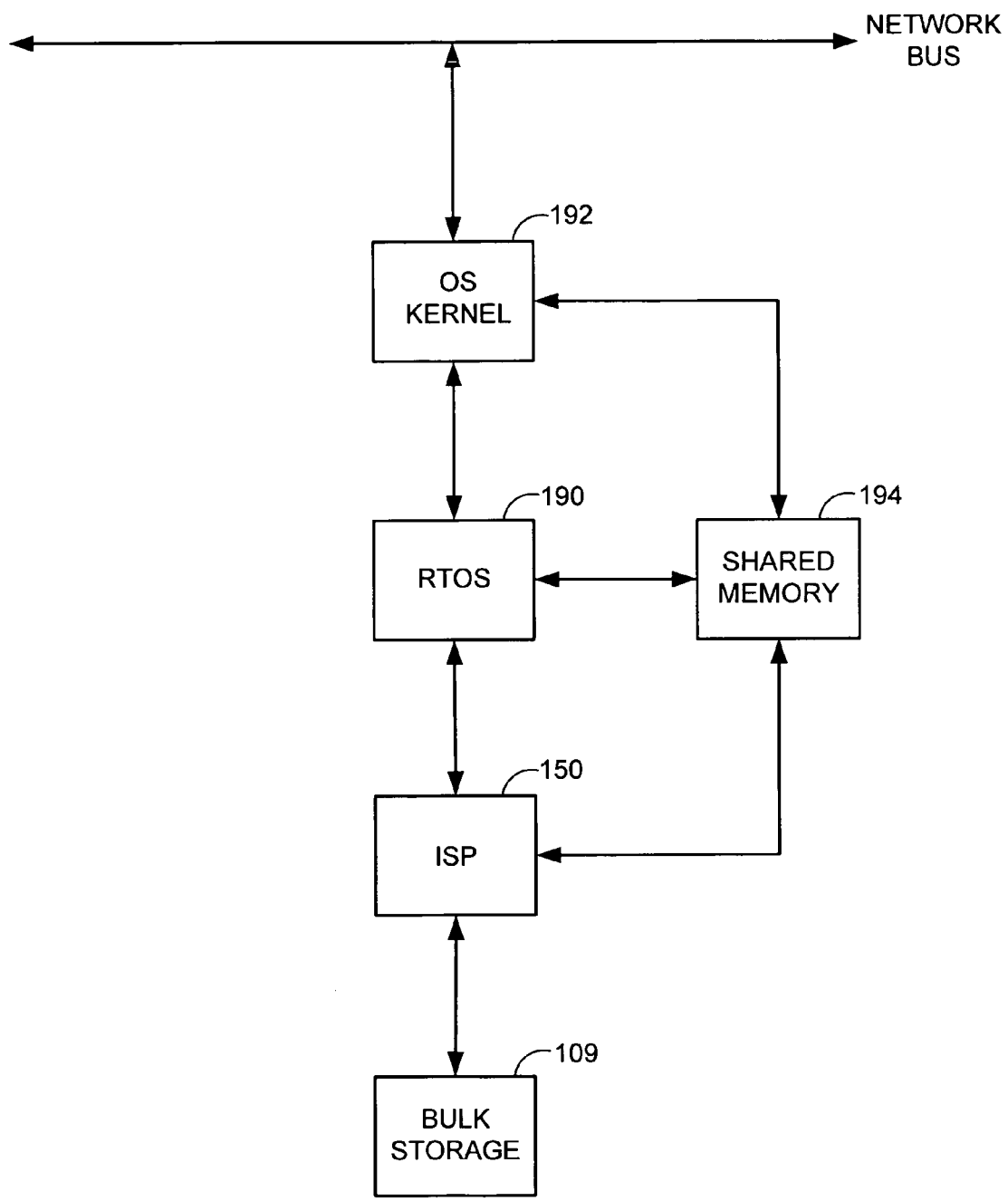
FIG. 8 is a functional block diagram of the intelligent data storage subsystem of FIG. 3.

FIG. 8 illustrates a functional block diagram of the present embodiments that provide a method for storing and retrieving data in a network-attached data storage device by cooperatively multitasking the real time operating system (RTOS) 190, discussed above, and a general purpose operating system kernel (OS) 192 configured to communicate with the network 110. A shared memory space 194 is visible at the same virtual address to both datapath control firmware, via the RTOS 190, and kernel threads, via the OS 192. Preferably, the shared memory 194 is not visible to other processes.

Figure 9:
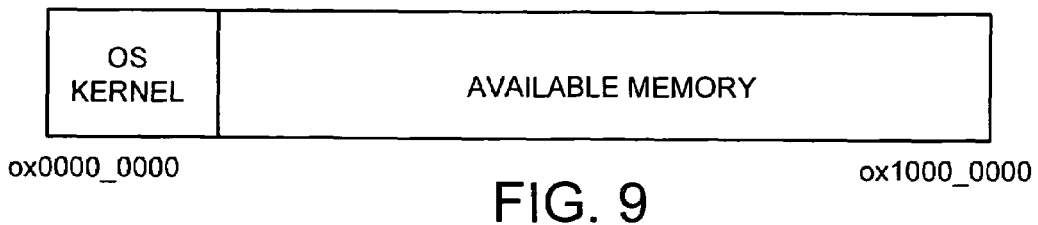
FIGS. 9-13 are diagrammatic illustrations of the mapping of the shared memory area.
Figure 10:
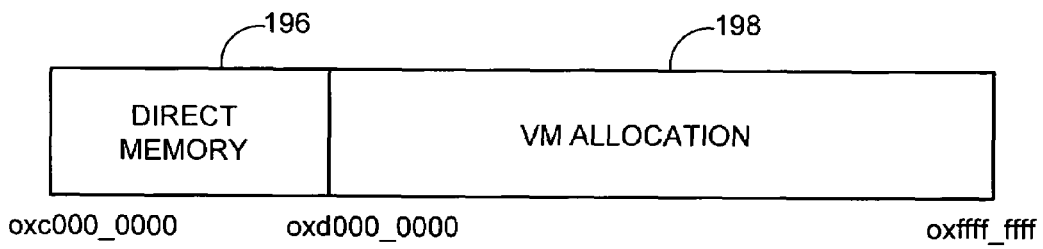
Figure 11:
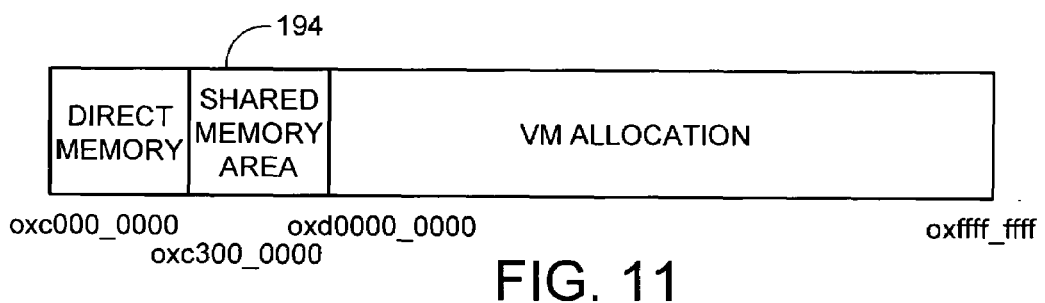

FIGS. 9-13 illustrate a method whereby the shared memory 194 is mapped. In FIG. 9 the OS 192 is loaded at the lowest physical address in the shared memory 194. Next, in FIG. 10 the OS 192 maps itself into the shared memory 194, and further breaks the area into two sections: a direct memory mapping area 196 and a virtual memory allocation area 198.

It is important that every virtual address in the shared memory 194 be covered with a physical memory, in order to prevent an occurrence of a miss exception. Commercially available OS kernels typically have a finite number of physical pages available for this purpose. Increasing the size of all the pages is not preferable, because that tends to lead to fragmenting the memory and slow the processing speed. Instead, it has been observed to be advantageous to reserve only a portion of the available pages and increase their size to cover the virtual memory addresses. For example, for a 200 MB shared memory 194 and pages aligned at a page size of 16 MB, a total of thirteen pages are necessary. During initialization, these thirteen pages are reserved, and not otherwise used or swapped. Also during initialization the kernel 192 can be instructed to reduce the amount of usable RAM within the kernel 192 by the size of the shared memory area 194. The shared memory area 194 should also be flagged as non-swappable by the kernel 192 during initialization.

Figure 12:
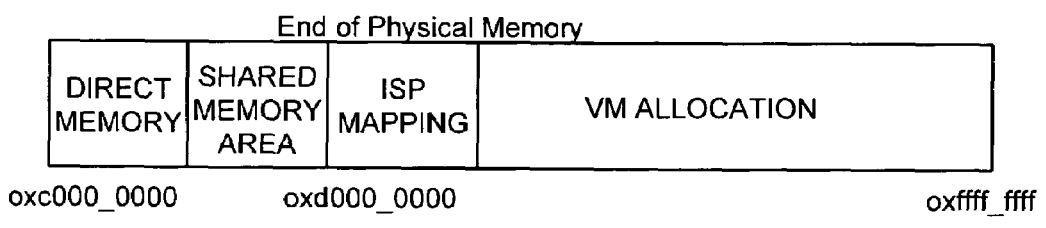
Figure 13:
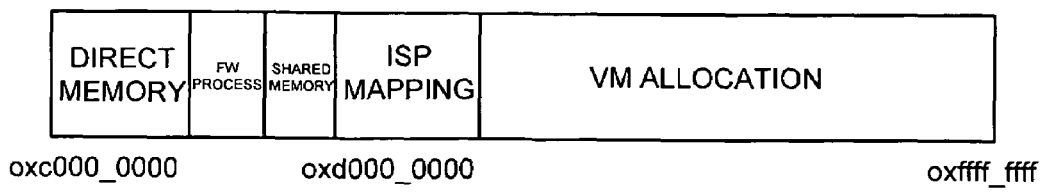

The ISP 150 has registers and memories that are needed for direct I/O, and are addressable via PCI addresses. FIG. 12 shows these addresses being loaded, beginning at the end of physical memory. Finally, FIG. 13 shows that after initialization, the ISP 150 switches to kernel mode and moves the data structures indicative of the present configuration to the shared memory 194. The shared memory 194 is thus completely mapped, and is then inserted into the firmware page tables and VMA structures. The ISP 150 then returns to user mode and firmware processing continues.

Figure 14:
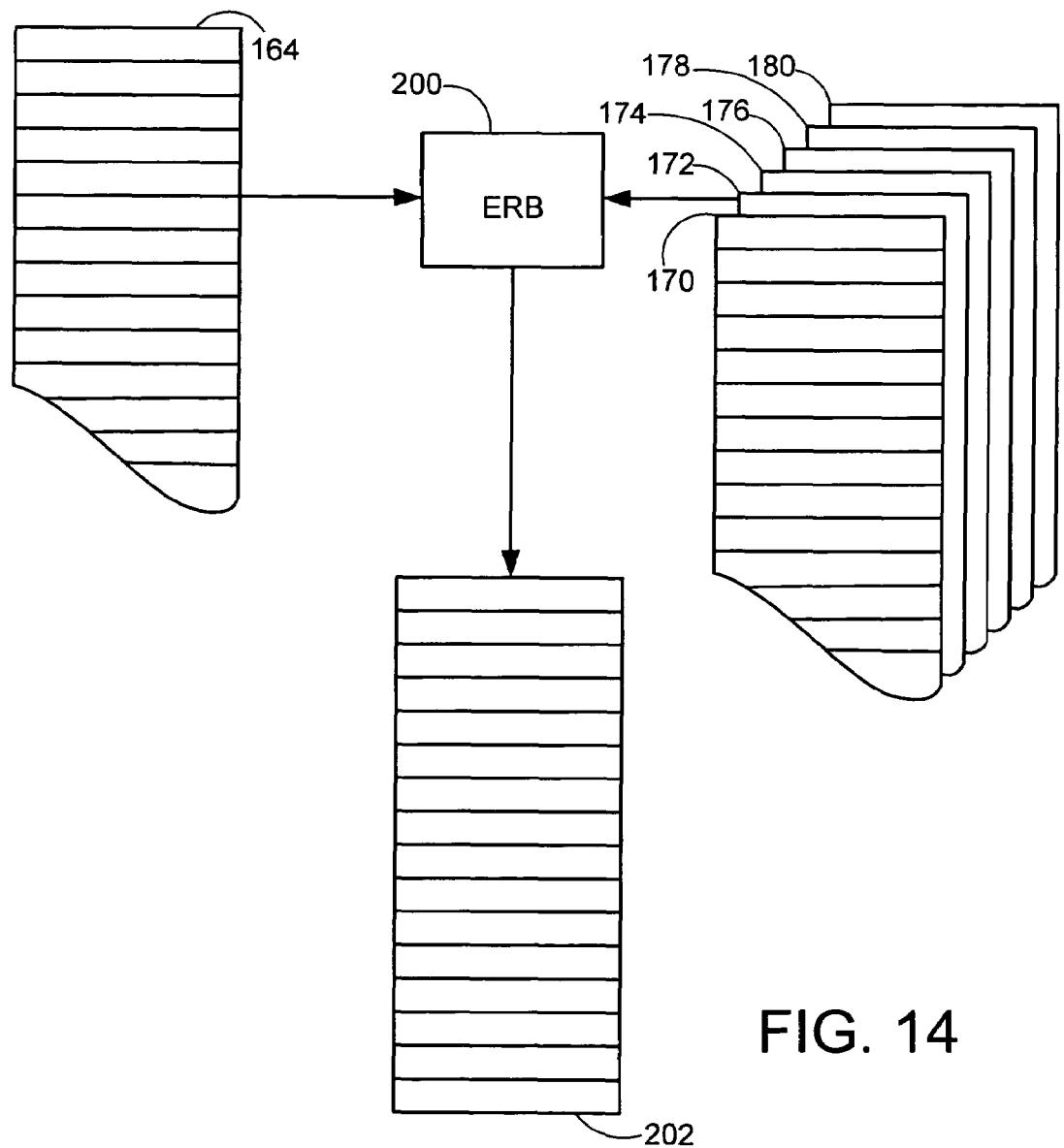
FIG. 14 is a diagrammatic illustration of the simultaneous processing by the FCCs in the ISP and the kernel threads and firmware threads on the policy processor.

FIG. 14 illustrates the single queue of critical path work items that are processed without context switch overhead, at least to some extent context free, during the processing. By "context-free" it is meant that all contexts related to the respective kernel threads 200 have been deliberately stored in the shared memory 194 rather than randomly on a stack. FIG. 14 shows the simultaneous processing by the plurality of FCCs (170-180) in the ISP 150 and the kernel threads and firmware threads on the policy processor 164, generating new work to be processed by the kernel threads and firmware threads. The new requests pass through an event ring buffer (ERB) 200 via an interrupt service routine (ISR) which places the work item on a waitless thread work ring (WTWR) 202. A kernel process removes the item pointers, such as in a FIFO sequence, and invokes "work segments" to process the items. Note that the WTWR 202 allows passing of items without using any fields on the data structures for link pointers. This minimizes the overhead substantially because neither linking nor disabling of interrupts is required.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A method comprising:
   sequencing an operating system kernel module via instructions stored in computer readable memory to communicate data between a storage device and a remote device;
   sequencing a policy processor to execute a real time operating system module, the operating system kernel module not included in the real time operating system module, via instructions stored in computer readable memory to establish datapath control for data transfers with respect to the storage device;
   mapping a shared memory so that it is addressable at a same virtual address for both a kernel thread from the operating system kernel module and a firmware thread from the policy processor executing the real time operating system module; and
   storing datapath control firmware configuration information in the shared memory.

2. The method of claim 1 comprising making the shared memory not visible to other processes.

3. The method of claim 2 comprising loading the operating system kernel module at the lowest physical address of the shared memory.

4. The method of claim 3 comprising the operating system kernel module mapping itself into an area of the shared memory.

5. The method of claim 4 comprising pinning a physical page to every virtual address in the shared memory.

6. The method of claim 5 comprising reserving a portion of physical pages available from the operating system kernel module for covering all virtual addresses, and increasing a page size that each reserved page maps.

7. The method of claim 6 comprising reducing an amount of usable random access memory (RAM) in the operating system kernel module by the size of the shared memory.

8. The method of claim 7 comprising the operating system kernel module flagging the shared memory as non-swappable.

9. The method of claim 8 wherein the operating system kernel module maps device register peripheral component interconnect (PCI) addresses to the shared memory.

10. The method of claim 9 comprising mapping a virtual memory allocation at a true end of physical RAM.

11. An apparatus comprising:
    an operating system kernel module communicating data between a data storage device and a remote device;
    a policy processor executing a real time operating system module, the operating system kernel module not included in the real time operating system module, handling datapath control of data transfers with respect to the data storage device;
    a shared memory that is addressable at a same virtual address for both a kernel thread from the operating system kernel module and a firmware thread from the policy processor executing the real time operating system module; and
    datapath control firmware configuration information stored in the shared memory.

12. The apparatus of claim 11 wherein the shared memory is mapped with respect to device register peripheral component interconnect (PCI) addresses.

13. The apparatus of claim 11 wherein the shared memory is non-swappable.

14. The apparatus of claim 11 wherein the processor comprises a plurality of function-specific controllers communicating with one or more list managers via a cross point switch.

15. The apparatus of claim 11 wherein the firmware threads and kernel threads are processed to generate work items that are passed to a work ring via an event ring buffer.

16. A method comprising:
    sequencing an operating system kernel module via instructions stored in computer readable memory to communicate data between a storage device and a remote device;

sequencing a processor to execute a real time operating system module, the operating system kernel module not included in the real time operating system module, via instructions stored in computer readable memory to establish datapath control for data transfers with respect to the storage device;

mapping a shared memory so that it is addressable by kernel threads from the operating system kernel module and by firmware threads from the processor executing the real time operating system module;

storing datapath control firmware configuration information in the shared memory;

reserving a portion of physical pages available from the operating system kernel module for covering all virtual addresses; and increasing a page size that each reserved page maps.

* * * * *